Nov. 2, 1926.

R. B. MILLARD 1,605,264

EQUALIZING SYSTEM FOR BUBBLE TOWERS

Filed August 18, 1925   2 Sheets-Sheet 1

Inventor
Raymond B. Millard

Attorney.

Nov. 2, 1926. 1,605,264
R. B. MILLARD
EQUALIZING SYSTEM FOR BUBBLE TOWERS
Filed August 18, 1925  2 Sheets-Sheet 2
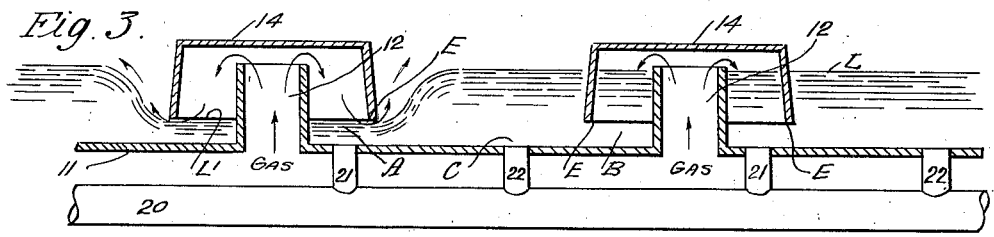
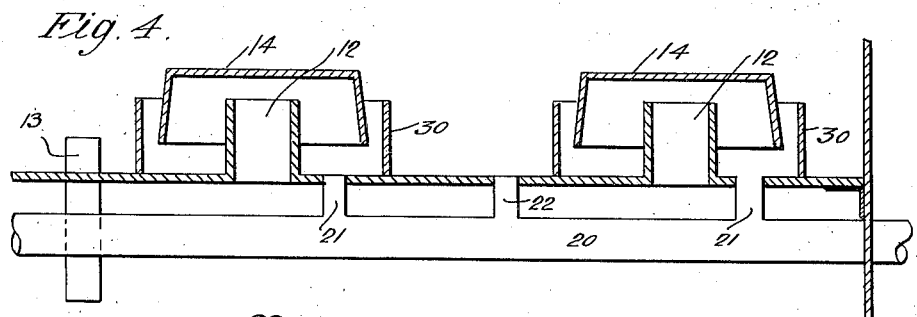
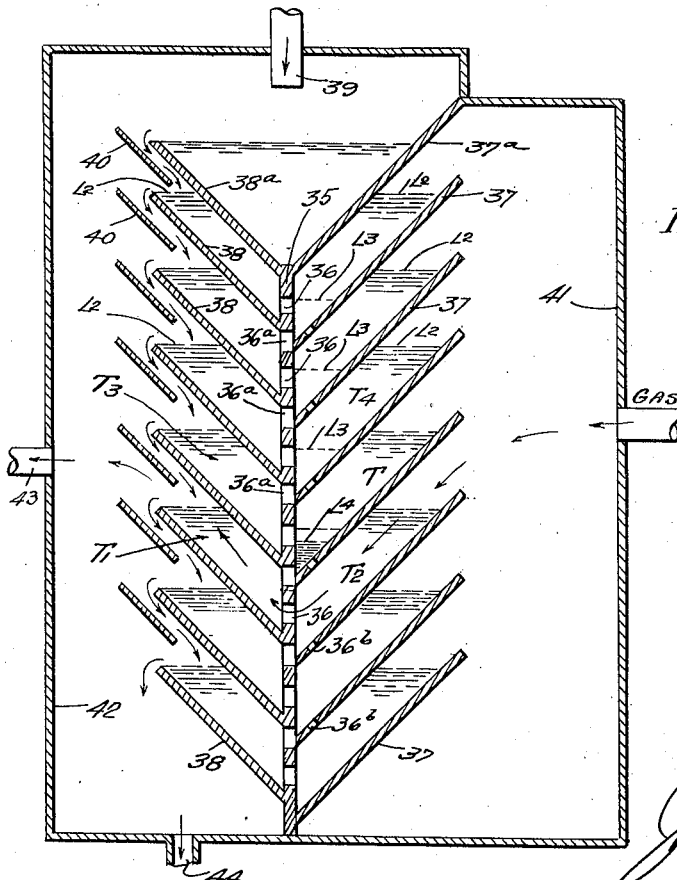
Inventor
Raymond B. Millard
Attorney.

Patented Nov. 2, 1926.

1,605,264

UNITED STATES PATENT OFFICE.

RAYMOND B. MILLARD, OF LOS ANGELES, CALIFORNIA, ASSIGNOR, BY DIRECT AND MESNE ASSIGNMENTS, TO SOUTHWESTERN ENGINEERING CORPORATION, OF LOS ANGELES, CALIFORNIA, A CORPORATION OF CALIFORNIA.

EQUALIZING SYSTEM FOR BUBBLE TOWERS.

Application filed August 18, 1925. Serial No. 51,071.

This invention relates to apparatus of the type commonly known as bubble towers. A typical bubble tower is an apparatus in which gases and liquids are commingled by an action involving bubbling of the gas through the liquid; and a typical structure involves what may be termed an inverted weir under which the gas flows, after depressing the liquid level at one side of the weir, and then bubbles up through the liquid at the other side. Commonly such structures are made with a plurality of such weirs in order to increase the capacity of an apparatus of given size; and quite often the structure takes the form of a plurality of inverted cups standing in a common liquid body and under which cups the gas is introduced to press the liquid level down within the cup and flow under its inverted edge. There are other types of structures, one of which is typified in my pending application Serial Number 709,811, filed April 29, 1924, entitled "Bubble towers". In that type of structure the inverted weirs under which the gas flows are made in the form of inverted troughs having some longitudinal extent. All these things will be explained more fully later; the foregoing statement being made in advance so a general statement of the invention may be given preliminarily to aid in an understanding of the specific applications of the invention hereinafter described.

It is one of the peculiar and seemingly inherent difficulties in bubbling apparatus of the type described that there is a more or less uncontrollable tendency for one or a few of the gas passages to concentratedly take all or most of the gas to the exclusion of all the remainder. Just why this is so may be somewhat difficult, and in fact may be unnecessary, to explain fully; but the circumstances are known as matters of fact. The slightest inequality as between the several gas passages under the bubbling edges or through the bubbling apertures (the actual passages are usually notches in an inverted edge, or are apertures in a wall) inevitably induces this concentrated passage of the gas. It has, therefore, been necessary in the manufacture and setting up of bubble towers to machine and assemble and set the apparatus with the greatest possible accuracy so that all the edges or apertures that are arranged to pass the gas in parallel relationship shall be as nearly as possible at exactly the same level and, therefore, under exactly the same hydrostatic pressure. But even when all possible precautions are taken, there is always a liability of some slight foundation settlement, or buckling or warping of sheets or plates, or the accidental misplacement of one or more of the elements; any of which causes will induce a higher element to take all the gas to the exclusion of all the others. And even when the assembling and setting are as perfect as may be, it has been found that very slight temporary inequalities of pressure at the several elements, due for instance to a surge of the liquid body or a surge of gas pressure, may cause one element to begin taking more than its share of gas. And it seems to be peculiarly inherent to the action of these structures that if one gas passage for any reason temporarily passes more than its share of gas, the quantity of gas at that passage will immediately further increase until the rising velocity and consequently rising friction at that passage reaches a critical point at which the forces are balanced. Thus in the most carefully installed structure it is almost inevitable, at least when operating at less than full capacity, that one or a few of the elements will "hog" the entire or substantially the entire flow of gas and thereby render the apparatus inefficient. The objective function of all such bubble towers is the intimate and uniform distribution and commingling of the gases with the liquids, and of course this function is destroyed whenever the gas flow is concentrated at any one or few elements.

It is an object of this invention to overcome the difficulties above set forth; to overcome not only difficulties that arise from inaccurate setting of the elements, but also the difficulties that are inherent in the structures even when the elements are set accurately. I accomplish this object by providing a simple structure whereby the hydrostatic pressures at the different elements are put in constant balance with each other; and by so doing I cause an automatic equalizing action to take place between the several elements that immediately equalizes any inequality of gas flow. The apparatus for this purpose may either be in the form of an attachment, so to speak, to bubble towers of previously known types, or it may be a part of the bubble tower structure itself. In the following detailed descriptions given as an illustration of the invention, I set out the application of my equalizing system to known types of bubble towers; and also a new type of bubble tower in which the equalizing arrangements are very readily incorporated within the structure of the bubble tower itself. As to this new bubble tower structure, the broad idea of equalizing arrangements is made a part of this application, while its specific structure as a bubble tower and the specific form of its equalizing arrangement are made the subject matter of an application filed on even date herewith entitled "Bubble tower" and bearing Serial Number 51,072.

In every case where my equalizing system is used, the necessity of more accurate alignment of the elements is obviated. Of course, as will be readily understood, the various elements must be aligned as to level with fair accuracy in order that in normal operation the gas shall be as uniformly and evenly distributed through the liquid as is practicable; but the equalizing system makes it unnecessary to go to great lengths in obtaining accuracy of alignment, as the operation of the system prevents any element that happens either temporarily or continuously to pass a slightly larger amount of gas from "hogging" the gas from other elements.

With the foregoing understanding of the general object and nature of the invention, the invention itself, in its broader aspects, will now be best understood from the following detailed and specific descriptions setting out the application of my equalizing system in preferred and illustrative forms to typical forms of bubble towers; and for this purpose reference is made to the accompanying drawing, in which:

Fig. 3 is a more or less diagrammatic view illustrating the action of the equalizer;

Fig. 4 is a sectional view showing a modification of the form shown in Fig. 1; and Fig. 5 is a sectional view showing in simple form my new type of bubble tower in which the equalizing system is incorporated.

It will be understood that, in the following descriptive matter and wherein I explain in some detail specific forms of bubble towers and equalizers applied thereto, I do not thereby intend that the present invention shall be limited to such described details; as I give my description in detail not for the purpose of limiting the invention, but for the purpose of enabling those skilled in the art to have a clear and full understanding of the invention itself in its broadest scope through the medium of a clear and explicit understanding of the application of the invention in specific forms.

Figure 1:
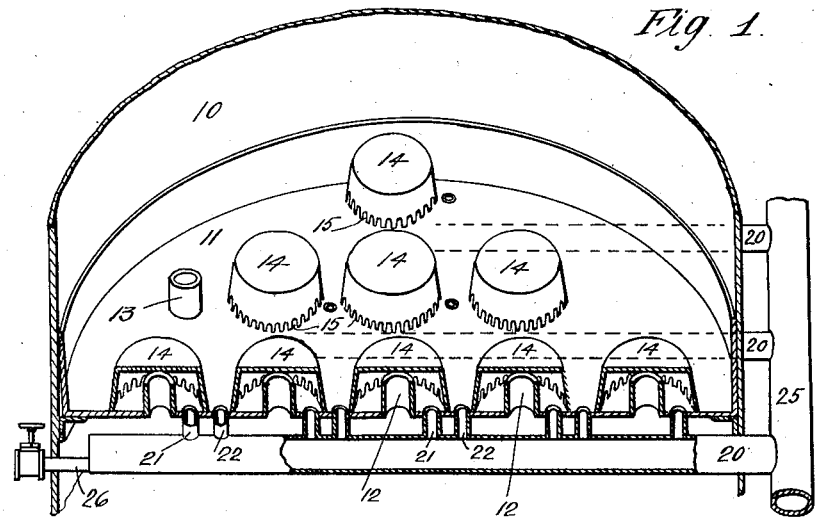
Fig. 1 is a perspective showing the application of my system to a bubble tower of the circular cap form.
Figure 1:
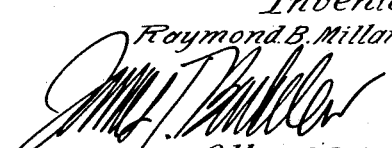

In Fig. 1 there is illustrated a part of a bubble tower that has an outer casing 10, which is usually in the form of a tower. This casing 10 will usually carry a plurality of superimposed horizontal floors 11, and each such floor has extending through it a plurality of risers 12 defining openings through which the gas may pass upwardly through the floor from the space immediately below; all the risers, and therefore all the bubbling elements on each floor, being in parallel relationship as to gas flow. These risers are of sufficient height so that the liquid standing at level L (see Fig. 3) will not flow over their upper edges. The liquid level L at each floor is maintained by an overflow such as illustrated at 13, through which the liquid constantly flows downwardly through any given floor onto the floor next below.

Over each riser 12 there is an inverted cup-shaped cap 14 and these caps, preferably resting with their lower edges on the floor, are provided with peripheral notches 15, the upper edges of which define the edge under which the gas flows when it is bubbled through the liquid. Other elements and structures may be used, but the one described is typical. Each floor carries as many such bubbling elements as it may, in order to make as high as possible the capacity of a bubble tower of given size; and it will be readily understood how difficult it may be in the original manufacture, assembly and installation of such a tower to align all the elements on a given floor so that the inverted edges under which the gas flows shall be accurately at a level.

Referring now more particularly to Fig. 3, let us suppose that gas under pressure is passing upwardly through risers 12 and is pressing down the liquid level within cups 14. Under conditions of absolute equality, the liquid levels in the several cups will be pressed down until the gas can just bubble under the several edges indicated at E in diagram of Fig. 3. If for any reason one of these elements begins to pass gas before the others, or begins to pass an increased quantity of gas, a condition such as indicated in Fig. 3 will take place immediately. The total quantity of gas will (especially if the device is acting at less than full capacity) immediately begin passing through one of the elements (as shown at the left in Fig. 3), leaving the other element or elements in somewhat the operative condition shown at the right in Fig. 3. In so doing this element shown at the left in Fig. 3 will pass gas in such quantity as to depress the liquid level within cap 14 to such a level as indicated at $L^1$, while the liquid level in the cap at the right in Fig. 3 will remain high, although the same gas pressure is still exerted upon the liquid within that cap. The concentrated flow of gas through the cap shown at the left blows all the liquid away from the space immediately surrounding the cap, somewhat as is illustrated in Fig. 3, and the gas has more or less free passage, at least up to a certain critical velocity, through this cap. This condition will continue until something happens to disturb the force and pressure balance. If the amount of gas fed to the bubble tower is greatly increased, then other elements, for instance the one shown at the right in Fig. 3, will begin to take gas; but even under these conditions the one that has first started to pass a disproportionally large quantity of gas will continue to pass more than its share.

During the time when unequal passage of the gas takes place, the liquid pressure beneath the caps passing little or no gas are still substantially equal and are also substantially equal to the hydrostatic pressure in the common liquid space exterior of the caps. This is readily seen to be the case when it is considered that although the liquid level within the cap or caps may be somewhat depressed, the hydrostatic pressure within the caps must always be equal to the hydrostatic pressure in the space exterior of the caps, because the space within the cap is in direct and practically static communication with the space exterior. This is true when the liquid is standing undisturbed by flow of gas, and is true when the gas is passing substantially equally through all the elements. But when the condition of Fig. 3 takes place the comparatively high velocity of gas passing through the cap at the left causes (or may be said to be caused by the conditions being interrelated) a relative lowering of gas pressure over the liquid within the cap and under the edge, the liquid being kept displaced from under and around the cap at least in part by the velocity of the gas. Consequently the hydrostatic pressure at the point A in Fig. 3 is somewhat less than the hydrostatic pressure at the points B and C. By providing means for equalizing the hydrostatic pressures by flow of liquid between these points, I equalize the action of the several elements. In the form of apparatus shown in Figs. 1 and 3 this is done by connecting these several points through a separate passage or conduit 20, which, in typical arrangement, may be placed under floor 11 and have vertical connecting pipes 21 that pass through the floor under the caps and also may have vertical connecting pipes 22 that pass through the floor to the spaces exterior of the caps. It may not be necessary to provide the pipes 22, but I find them convenient as they serve to assist in an equalization of hydrostatic pressures over the whole floor in case of any disturbance of the liquid level and valuable for the removal of water, sediment or other material which might otherwise accumulate. From what has been said the operation of the equalizer connections will be readily understood. If the condition shown in Fig. 3 obtains, liquid, which is always standing in connection 20 and pipes 21 and 22, will flow immediately from other parts to the space under the cap that is passing the gas, with the result that the liquid level $L^1$ is raised and the flow of gas through that element cut down to the point where the gas pressure in other elements will increase, and a flow through the other elements will start and continue. And once the flow having been started through all the elements, the same action is constantly taking place to equalize as effectively as may be the flow through all of them, keeping them all operating in equality.

It will be seen from what I have said that the equalizing action depends for its efficacy on the introduction of liquid to the liquid body under level $L^1$ from the liquid at some point where the hydrostatic pressure is higher. Such point may be either in the common body of liquid exterior of the caps or may be in the body of liquid under a cap that is passing little or no gas; in fact the hydrostatic pressures at these two points are equivalent—the passage of liquid from either of these points is in practical essence one and the same thing except in so far as there may be surges in the common body level not instantaneously reflected in the levels within the caps.

In an arrangement such as is shown in Fig. 1, each line of elements may have beneath it a connecting passage 20; and a cross connecting passage 25 either inside or outside the tower serves to cause equalization between the several lines or rows of elements just as the individual passages 20 cause equalization between the several elements of each line or row. It may be preferable to place the cross connection 25 outside the tower as it is then practicable to take off samples from this cross connection, samples being thus obtained from the various levels of the tower. Also a connection, such as shown at 26, may be extended to the exterior of the tower, and through this connection the liquid may be introduced individually to each floor if so desired, the introduction taking place under the several caps. With the liquids so introduced, it will be seen that the equalizing actions are still maintained, the liquid being put in at the very point where equalizing action takes effect.

Figure 2:
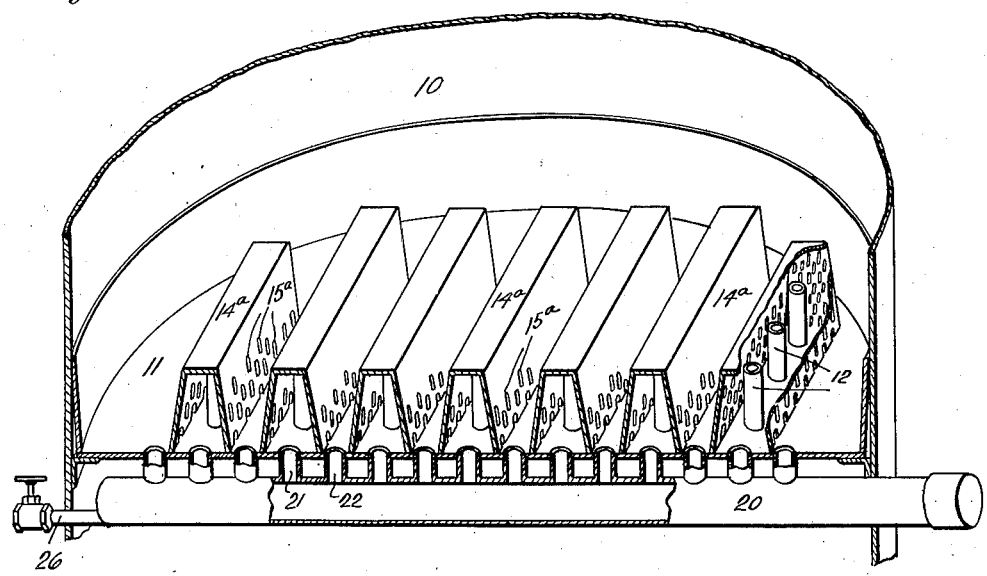
Fig. 2 is a perspective showing the application of my system to a bubble tower of a rectangular cap or inverted trough form.

In Fig. 2 a bubble tower of the rectangular cup or inverted trough type is shown. Here the caps are in the form of long inverted troughs 14ª with perforations or notches 15ª in the lower parts of their side and end walls. The rises 12 may be the same as before described; and the equalizing connecting passage 20 with its pipes 21 and 22 are the same as before described; except that in this case only one equalizing passage may be necessary. This type of construction has another advantage over the type shown in Fig. 1 which involves a plurality of caps with free intercommunication between all parts of the liquid immediately surrounding the individual caps. In the cap form it is somewhat difficult to maintain exactly the same liquid seal—height of liquid—above the gas orifices of the several caps, due to the very free interconnection between all parts of the body of liquid surrounding the caps. In the long inverted trough form the parts of the liquid body immediately surrounding the troughs only have intercommunication around the ends of the long troughs; so that any disturbance set up in the liquid is more efficiently damped out. This same advantage—the idea of a more or less individual oil reservoir for each element—may be successfully applied to the round cap type in such a manner as is shown in Fig. 4, where each cap is surrounded by a circular weir wall 30, the height of this wall determining the height of the liquid immediately surrounding the cap and forming an individual body of liquid for each cap. The liquid in this case may be delivered immediately to the space within the individual circular wall 30, either through the equalizer connection or by being dropped down from above within the individual circular enclosures. In this way each cap is surrounded by a relatively small and individual body of liquid and not surrounded by a large common body of liquid; and thus it will be seen that the main supporting plate may be considerably out of level before the gas will show a preferential selection to any extent.

In Fig. 5, I show in simple form the type of bubble tower that is the subject matter of the application hereinbefore referred to. I do not here go into details of practical structure of such a bubble tower, but merely describe it in an elementary way. Essentially there is a central plate 35 with perforations 36, preferably evenly distributed over the plate; and at the opposite sides of the plate there are inclined plates 37 and 38 that form troughs. At the upper end of plate 35 there may conveniently be two inclined plates 37ª and 38ª forming an upper trough into which the liquid is delivered through pipe 39, the liquid overflowing the upper edge of plate 38ª and being guided by apron 40 into the trough formed by the next plate 38 and opposite plate 37. When this trough is full the liquid overflows the edge of that plate 38 and, guided by apron 40, flows into the next trough, and so on to the bottom of the device. Plates 37 and 38 are so placed on plate 35, or perforations 36 are so placed with reference to the troughs formed by the plates, that there is at least one perforation 36 that forms an intercommunication between the trough formed by plate 37 and that formed by plate 38; so that when the device is full of liquid, the liquid will stand in all the troughs at the levels indicated by the letter $L^2$ presuming that the quantity of incoming liquid is equal to or greater than the discharge through perforations 36. The gas under pressure is introduced at the right hand side of plate 35 in Fig. 5, the gas being confined by a suitable casing 41 so that it must depress liquid levels $L^2$ in the troughs formed by plates 37 and pass through perforations 36. If the device is operating uniformly throughout, the liquid levels $L^2$ at the right of central plate 35 will all be depressed to the levels indicated by the dotted line at $L^3$ and the gas will bubble equally, or as nearly equally as may be, through the several corresponding perforations 36, bubbling up through the bodies of liquid at the left of plate 35 and passing out into the casing 42 which encloses the space at the left hand side of the plate, the gas then passing off through an outlet such as indicated at 43. The liquid after passing down through the device may pass off through such an outlet as is shown at 44.

But in case of any inequality in construction or arrangement, or any temporary inequality in pressures, the liquid level in one of the right hand troughs may be pressed down to such a point as is indicated at $L^4$ and the gas immediately begins to flow in larger quantities and at higher velocities through the corresponding perforation 36, more or less blowing out the liquid that stood over the corresponding inclined plate 38 at the left of the central perforated plate. The resistance to gas flow is thus greatly decreased and this particular perforation will then keep on taking and passing all of the gas, or a disproportionate share of it, until equilibrium conditions are restored. In this particular type of bubble tower, the restoration of equilibrium conditions is accomplished fundamentally in the same manner as in the types hereinbefore described; that is by intercommunication of the hydrostatic pressures to the space at the gas side of the perforation or opening through which the gas flows and below which the gas pressure has depressed the liquid surface. For instance, in a construction where central plate 35 is provided with uniformly spaced perforations, the inclined trough plates 37 at the gas side of plate 35 (the right hand side in Fig. 5) may be lowered so that a perforation 36$^a$ communicates with the lower part of the trough formed by each trough plate 37. These perforations 36$^a$ thus form liquid communications between each trough at the right of plate 35 and a trough at the left of plate 35. For instance, as shown in Fig. 5, it is trough T in which the liquid level has been inordinately lowered to level L$^4$, and the perforation 36$^a$ connects this trough T with trough T$^1$ at the opposite side of the plate. Trough T$^1$ is, of course, in communication through perforation 36 with trough T$^2$ at the right of plate 35. When the liquid level in trough T is so lowered, the liquid in that trough has flowed partially through opening 36 into trough T$^3$ at the left of the plate and has been more or less blown out by the increased flow of gas; but the liquid has also partially flowed through perforation 36$^a$ into trough T$^1$, tending to keep that trough full in spite of the fact that the blowing out of liquid from trough T$^3$ may tend to prevent that liquid from flowing over the edge of trough T$^3$ and into trough T$^1$. Consequently in pressing down the liquid level to L$^4$ the gas pressure is opposed by the hydrostatic pressure in trough T$^1$, and also in communicated trough T$^2$; and this opposition prevents the liquid from being initially lowered, or if it has been somewhat lowered and the gas flow increased, it tends immediately to restore the liquid level to L$^3$. Immediately this is done, the other liquid levels will also be lowered to L$^3$ and maintained there by the increased gas pressure made effective on those other troughs.

In addition to, or in substitution for the perforations 36$^a$, perforations 36$^b$ may be located in the lower parts of the trough plates 37. These perforations, as will be readily seen, form intercommunications directly between the liquid bodies in the troughs at the right hand side of plate 35. Their action is essentially the same as before described for perforations 36$^a$. In case the liquid level goes to L$^4$ in trough T, the hydrostatic pressure in trough T$^2$ and intercommunicating trough T$^1$ immediately tends to raise that liquid level. But in addition it will be noted that a perforation located at 36$^b$ will be passing liquid from the trough T$^4$ down into trough T, where the liquid level is unequally lowered. Thus, with the perforations placed at 36$^b$, the trough in which the level lowers to L$^4$ is being replenished with liquid from both the trough above and the trough below, to raise its liquid level. In both these operations of perforations 36$^b$, it is seen that the liquid is delivered into the trough T; that is, the liquid is delivered into the body of oil that stands on what may be termed the gas side of the perforation 36 through which the gas is flowing—is delivered to that part of the liquid body whose level has been lowered in order to allow the gas to pass through perforation 36. And in this action it will be seen that perforation 36$^d$, in both its operations, accomplishes essentially the same equalizing flow of liquid as has hereinbefore been described for the other forms of bubble towers. Perforations 36$^a$ in its equalizing action passes liquid for instance from trough T$^1$ and communicated trough T$^2$ into trough T to the gas side of perforation 36 of trough T. But the perforation 36$^a$ that passes liquid downwardly from trough T$^4$ passes that liquid to the left hand side of plate 35, or to what may be termed the liquid side of perforation 36 through which the gas is passing; and due to that passage of gas through perforation 36$^a$ the liquid that comes down from perforation 36$^a$ of trough T$^4$ does not find its way into trough T.

It will be understood that, while holes 36$^a$ or 36$^b$ are large and numerous enough to pass the liquid for equalizing action, they are not of such aggregate capacity as to pass more than a fraction of the liquid flowing down through the apparatus, so that there is always liquid flowing over the edges of plates 38. A constant downward flow of some liquid through holes 36$^a$ or 36$^b$ is not objectionable, as long as that flow is not equal to the total liquid flow through the device. In practice, the device may be quite long in the plane of central plate 35 and a few and relatively widely spaced holes 36$^a$ or 36$^b$ suffice for equalization. Or, if those holes are more closely spaced, they are made individually smaller.

I claim:

1. In combination with a bubble tower structure that comprises a plurality of liquid holding elements each including a wall with a submerged opening, and each having means to feed fluid under pressure above a liquid surface at one side of the wall to depress the liquid at that side and to pass through the opening to bubble up through the liquid at the other side, the several fluid feeding means being in turn fed in parallel relation from a common source; an equalizer comprising a liquid communication adapted to pass liquid between the several elements and to each element at a point on the gas pressure side of said wall.

2. In combination with a bubble tower structure that comprises a common liquid chamber in which a liquid body is maintained at a predetermined height, a plurality of walled gas pressure chambers with submerged gas passage openings, and means to introduce gas under pressure to the several chambers to depress the liquid level therein to said openings so that the gas passes through the openings to bubble up through the liquid body outside the chambers; an equalizer comprising a liquid communication adapted to pass liquid from the common body to each chamber.

3. In combination with a bubble tower structure that comprises a plurality of liquid holding elements each including a wall with a submerged opening and each having means to feed fluid under pressure above a liquid surface at one side of the wall to depress the liquid at that side and to pass through the opening to bubble up through the liquid at the other side, the several fluid feeding means being in turn fed in parallel relation from a common source; means for equalizing the hydrostatic pressures between the several elements at points on the gas pressure sides of their said walls.

4. In combination with a bubble tower structure that comprises a common liquid chamber in which a liquid body is maintained at a predetermined height, a plurality of walled gas pressure chambers with submerged gas passage openings, and means to introduce gas under pressure to the several chambers to depress the liquid level therein to said openings so that the gas passes through the openings to bubble up through the liquid body outside the chambers; means for equalizing the hydrostatic pressures between the several chambers.

5. In combination with a bubble tower structure that comprises a common liquid chamber in which a liquid body is maintained at a predetermined height, a plurality of walled gas pressure chambers with submerged gas passage openings, and means to introduce gas under pressure to the several chambers to depress the liquid level therein to said openings so that the gas passes through the openings to bubble up through the liquid body outside the chambers; means for equalizing the hydrostatic pressures between the common body of liquid and the several chambers.

6. In combination with a bubble tower structure that comprises a common liquid chamber in which a liquid body is maintained at a predetermined height, a plurality of walled gas pressure chambers with submerged gas passage openings, and means to introduce gas under pressure to the several chambers to depress the liquid level therein to said openings so that the gas passes through the openings to bubble up through the liquid body outside the chambers; an equalizer comprising a liquid communication adapted to pass liquid from one chamber to another.

RAYMOND B. MILLARD.